June 28, 1938.  H. H. GRECE  2,122,343
LUBRICATED DUST GUARD
Filed Feb. 19, 1937   2 Sheets-Sheet 1

INVENTOR.
Harry H. Grece
BY Everett J. Wright
ATTORNEY.

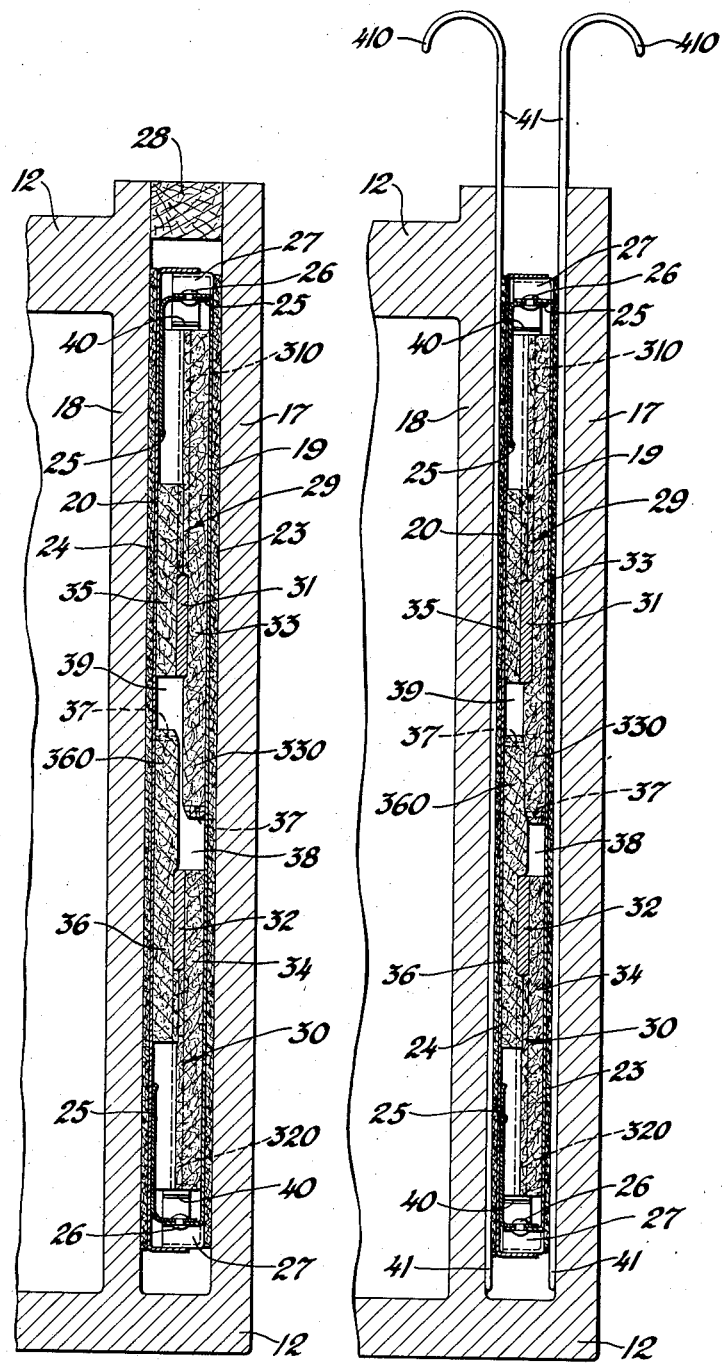

Patented June 28, 1938

2,122,343

UNITED STATES PATENT OFFICE 2,122,343

LUBRICATED DUST GUARD

Harry H. Grece, Detroit, Mich.

Application February 19, 1937, Serial No. 126,574

4 Claims. (Cl. 286—6)

This invention relates to dust guards and in particular to lubricant carrying dust guards adapted to be positioned in the dust guard pocket of a railroad car journal box and seal the opening between the hub seat of a car axle journaled therein and the said journal box.

The main object of this invention is to provide an improved lubricant carrying dust guard for sealing the opening between a railroad car journal box and a car axle journaled therein which will have an extremely long life under the most severe service conditions.

Another object of this invention is to provide a dust guard having an expansible casing by means of which it is readily and fixedly positioned in the dust guard pocket of a railroad car journal box.

Another object of this invention is to provide, in combination with a journal box having a dust guard pocket and a car axle journaled therein, a dust guard comprising an expansible casing adapted to engage the walls of said dust guard whereby to maintain itself properly positioned therein, and lubricant carrying wear resisting means within said expansible casing adapted to grip said car axle and seal the opening between said car axle and said journal box.

Another object of this invention is to provide a lubricant carrying wear resisting dust guard which is simple and inexpensive to manufacture, easy to apply, and which will give extremely long and efficient service.

Still another object of this invention is to provide a lubricant carrying dust guard which is easily positioned in the dust guard pocket of a journal box and which may be readily removed for re-lubrication when lubricant carried thereby becomes expended.

Other objects of this invention will become apparent by reference to the following detailed description taken in connection with the accompanying drawings, in which:

Fig. 5 is an enlarged detailed sectional view taken on the line 5—5 of Fig. 1.

Fig. 6 is an enlarged detailed sectional view similar to Fig. 5 showing means by which the dust guard is preferably positioned in or removed from the dust guard pocket of a journal box.

Figure 1:
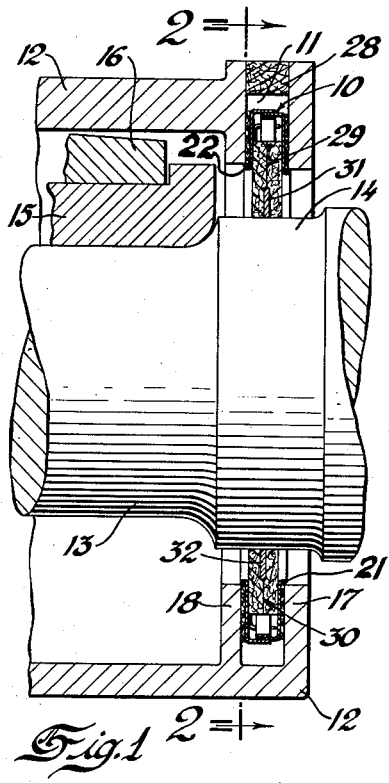
Fig. 1 is a fragmentary sectional view of a railroad car journal box showing a dust guard embodying the invention positioned in the dust guard pocket thereof and around the hub seat of a car axle.

Referring now to the drawings wherein like numerals refer to like and corresponding parts throughout the several views, the preferred embodiment of the invention shown therein comprises, in general, a dust guard 10 fixedly positioned in the dust guard pocket 11 of the journal box 12 into which the car axle 13 having a hub seat 14 is journaled by means of the bearing 15 secured in the top of the said journal box 12 by a suitable wedge 16.

The dust guard 10 comprises a casing composed of rectangular plates 19 and 20 each having a continuous lip integral therewith and formed normal thereto extending completely therearound; the casing plate 19 being formed so as to telescope within the casing plate 20. The casing plate 19 is provided with an aperture 190 therethrough slightly smaller than the axle aperture normally provided through the rear wall 17 of the journal box 12 as indicated by the dotted line 190 in Fig. 2. The casing plate 20 is likewise provided with an aperture 200 therethrough slightly smaller than the axle aperture normally provided through the partition wall 18 of the journal box 12 as indicated by the full line 200 in Fig. 2. The edges of the casing plates 19 and 20 around said apertures 190 and 200 respectively are preferably turned outward from said casings as best shown in Figs. 3 and 4 and specifically designated by the numerals 21 and 22 respectively.

The outside of each of the said casing plates 19 and 20 is covered with a very hard felt, canvas or other suitable fabric 23 and 24 respectively, which covering is permanently secured thereto by shellacking or riveting or both. If rivets are used the rivet heads on the inside of the casing plates 19 and 20 should have a feather edged periphery and the rivet heads on the outside of said fabric should be drawn so tightly toward the said casing plates as to effect a virtual countersink in respect to the outside surface of the said fabric.

The surface of the rear wall 17 and the partition wall 18 of the journal box 12 facing the dust guard pocket 11 should not be finished but left in its rough state after casting with only the extremely large burrs which would interfere with the correct positioning of a dust guard in the dust guard pocket 11 chipped off.

Figure 2:
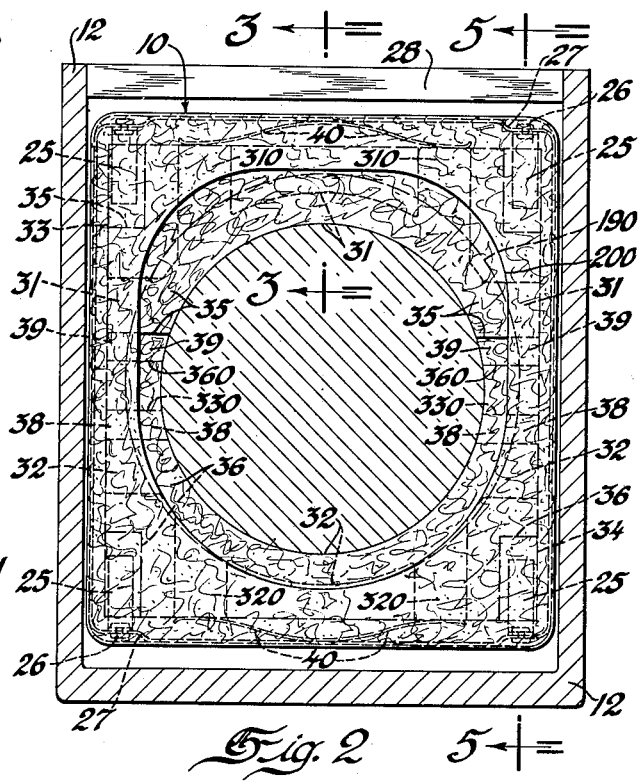
Fig. 2 is a sectional view taken on the line 2—2 of Fig. 1.
Figure 3:
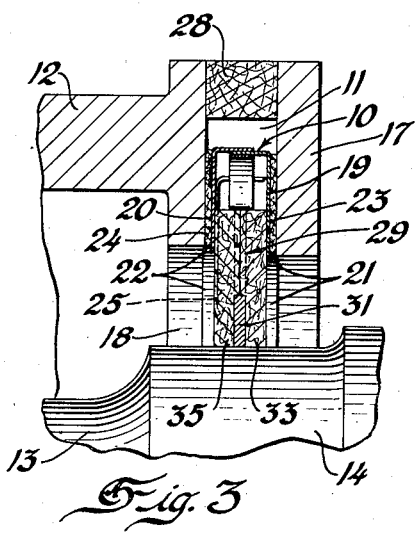
Fig. 3 is an enlarged fragmentary sectional view taken on the line 3—3 of Fig. 2.
Figure 4:
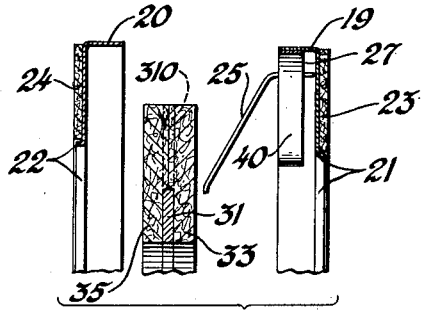
Fig. 4 is an enlarged exploded sectional view similar to Fig. 3 showing the dust guard removed from the dust guard pocket of the journal box.

A leaf spring 25 as best shown in Figs. 2, 3 and 4 is preferably secured by the rivets 26 to the continuous lip of the casing plate 19 near each corner thereof. The said leaf spring 25 is so shaped and disposed as to react against the casing plate 20 when the said casing plate 19 is telescoped within the casing plate 20 and urge the said casing to expand at all times. The continuous lip formed around the said casing plate 19 is provided with crimps 27 near each corner thereof to accommodate the heads of the rivets 26 to prevent the said rivet heads from interfering with the free telescoping of the casing plates 19 and 20 in respect to each other.

The casing of the dust guard 10 is inserted into the dust guard pocket 11 of a journal box 12 with the casing plates 19 and 20 in telescopic relationship to each other. The action of the leaf springs 25 expands the casing of the dust guard 10 in frictional contact with the dust guard pocket walls 17 and 18. The covering 23 and 24 of the casing plates 19 and 20 is urged by the said expansion of the dust guard casing tightly and under considerable pressure against the rough surface of the dust guard pocket walls 17 and 18 respectively and seal the joint between the casing plates 19 and 20 and the dust guard pocket walls 17 and 18. Because of the covered casing plates 19 and 20 being urged tightly against the rough walls 17 and 18 of the said dust guard pocket 11, the said dust guard 10 maintains itself in the position in which it is positioned until it is compressed and removed therefrom.

In the event the fabric covering 23 and 24 of the casing plates 19 and 20 respectively becomes flattened to such thinness or becomes torn or loosened in any manner so as to prevent the same from serving as a friction surface for holding the dust guard 10 in its proper position when the said dust guard 10 is expanded within the dust guard pocket 11, the outwardly turned edges 21 and 22 of the said casing plates 19 and 20 respectively will engage the dust guard pocket walls 17 and 18 adjacent the axle apertures therethrough and prevent the said dust guard from vibrating or being jarred out of its proper position in respect to the said axle apertures provided through the said walls 17 and 18 of the journal box 12.

A wooden wedge 28 or other suitable means may be used to seal the top of the dust guard pocket 11 after the dust guard 10 is properly positioned therein.

Upper and lower sealing means or assemblies 29 and 30 are slidably positioned between the casing plates 19 and 20 as best shown in Figs. 2 and 5. The upper sealing assembly 29 comprises an arcuate shaped wear resisting plate 31 for contacting the hub seat 13 of the car axle 14 when the said assembly is urged thereagainst, and lubricant carrying pads 33 and 35 secured on each side of the said wear resisting plate 31. The lower sealing assembly 30 comprises an arcuate shaped wear resisting plate 32 for contacting the hub seat 13 of the car axle 14 when the said assembly is urged thereagainst, and lubricant carrying pads 34 and 36 secured on each side of the said wear resisting plate 32.

The said lubricant carrying pads 33 and 35, and 34 and 36, are substantially rectangular in shape except for the sides thereof that are arcuately cut out to correspond to the wear resisting plates 31 and 32 respectively, and except that the corners of the pads 35 and 36 are notched as best indicated in Figs. 2 and 5 to prevent the same from fouling the casing expanding springs 25.

The upper lubricant carrying pad 33 and the lower lubricant pad 36 are provided with tabs 330 and 360 respectively at the sides thereof extending in lapped relation adjacent each other as best shown in Fig. 5 for sealing the opening at the sides of the said hub seat 13 of the car axle 14 between the sealing assemblies 29 and 30 when said assemblies are positioned against the said hub seat 13 of the car axle 14. Stitching 37 points the ends of the said tabs 330 and 360 as indicated in Fig. 5 to permit the said tabs to slide in relation to each other without fraying or binding. The said tabs 330 and 360 are of such a length in respect to the opposed pads 34 and 35 respectively as to leave spaces 38 and 39 therebetween to permit the said upper and lower sealing means 29 and 30 to wear and slide within the casing plates 19 and 20 toward each other without the ends of the said tabs 330 and 360 fouling the said opposed pads 34 and 35 respectively.

The wear resisting plate 31 is provided with two laterally spaced upwardly extending contact lugs 310 coextensive with the lubricant carrying pads 33 and 35 of the upper sealing assembly 29. The wear resisting plate 32 is provided with two laterally spaced downwardly extending contact lugs 320 coextensive with the lubricant carrying pads 34 and 36 of the lower sealing assembly 30.

The upper and lower horizontally disposed lips of the rectangular casing plate 19 are provided with suitable inwardly disposed bow springs 40 secured thereto and adapted to contact the upper and lower sealing assemblies 29 and 30 and constantly urge the same in sealed relationship against the hub seat 14 of the car axle 13, the lugs 310 and 320 of the wear resisting means 31 and 32 respectively receiving the spring pressure directly from the bow springs 40 whereby to cause the said arcuate wear resisting plates 31 and 32 to contact the said hub seat 14 of the car axle 13 and eliminate compression on and buckling of the lubricant carrying pads 33, 34, 35 and 36.

Thin metal strips 41 along each side of the dust guard 10 and between the said dust guard 10 and the walls 17 and 18 of the dust guard pocket 11 as indicated in Fig. 6 may be used to compress the expansible casing thereof while positioning the said dust guard 10 in or removing the same from the said dust guard pocket 11. The said metal strips 41 preferably extend out of the top of the dust guard pocket 11 and may be suitably hooked as at 410 to provide means whereby they may be readily removed from the said dust guard pocket 11.

Before placing a dust guard embodying the invention in a journal box, the entire dust guard is soaked in a suitable lubricant which is absorbed by the lubricant carrying pads 33, 34, 35 and 36. The said lubricant carrying pads 33, 34, 35 and 36 are preferably of felt or wicking or a combination of felt and wicking in layers or woven capable of retaining lubricant for long periods of time and feeding the said lubricant gradually to the surface of the sealing assemblies in contact with the hub seat 14 of the car axle 13 as well as providing an efficient seal therearound. The said lubricant carrying pads lubricate the wear resisting plates 31 and 32 in contact with the said hub seat 14 of the car axle 13 and lubricate the inside surfaces of the casing plates 19 and 20 against which the sealing assemblies 29 and 30 constantly slide as the car axle 14 moves in respect to the journal box 12. The wear resisting plates 31 and 32 are preferably of babbit or some other material harmless to the surface of the hub seat 14 of the car axle 13 against which the same are constantly urged under the pressure of the bow springs 40.

It is readily observed that this invention provides a novel, inexpensive wear resisting lubricant carrying dust guard, easy to position in the dust guard pocket of a journal box, readily removed therefrom when bearings are changed, and which is capable of having the wearing parts thereof replaced and renewed at little expense and with unskilled labor. By removing the sealing assemblies 29 and 30, the dust guard will give years of service under most severe conditions. The sealing assemblies 29 and 30 will outlast a number of sets of bearings 15 if properly lubricated when the said bearings are changed.

Although but one embodiment of the invention has been shown and described herein, it will be understood that various changes including the size, shape, arrangement and detail of the various parts thereof may be made without departing from the spirit of the invention, and it is not intended to limit the scope of the invention other than by the terms of the appended claims.

I claim:

1. In combination with a journal box having a dust guard pocket at the rear thereof and a car axle journaled in said journal box, a dust guard comprising an expansible casing adapted to engage the walls of the said dust guard pocket in sealed relationship thereto and maintain itself fixedly positioned therein, a pair of wear resisting sealing assemblies composed of lubricant carrying sealing means reinforced with wear resisting means slidably positioned within said expansible casing adapted to engage the said car axle in sealed relationship therearound with the wear resisting means thereof in contact with said car axle, and spring means within said casing adapted to constantly urge said sealing assemblies in sealed relationship against said car axle.

2. In combination with a journal box having a dust guard pocket at the rear thereof and a car axle journaled in said journal box, a dust guard comprising an expansible casing adapted to engage the walls of the said dust guard pocket in sealed relationship thereto and maintain itself fixedly positioned therein, a pair of sealing assemblies slidably positioned in said expansible casing shaped to contact the said car axle and seal the opening between the said car axle and the said expansible casing, each sealing assembly comprising a central wear resisting plate and a lubricant carrying pad secured to each side thereof, and spring means secured to and within said expansible casing adapted to contact said wear resisting means whereby to urge said sealing assemblies into sealed relationship against said car axle.

3. In combination with a journal box having a dust guard pocket at the rear thereof and a car axle journaled in said journal box, a dust guard comprising an expansible casing adapted to engage the walls of the said dust guard pocket in sealed relationship thereto and maintain itself fixedly positioned therein, a pair of sealing assemblies slidably positioned in said expansible casing shaped to contact the said car axle and seal the opening between the said car axle and the said expansible casing, each sealing assembly comprising a central wear resisting plate and a lubricant carrying pad secured to each side thereof, tabs extending from one lubricant carrying pad of each sealing assembly in lapped relationship to tabs extending from the opposite assembly, and spring means secured to and within said expansible casing adapted to contact said wear resisting means whereby to urge said sealing assemblies into sealed relationship against said car axle.

4. In combination with a journal box having a dust guard pocket at the rear thereof and a car axle journaled in said journal box, a dust guard comprising an expansible casing adapted to engage the walls of the said dust guard pocket in sealed relationship thereto and maintain itself fixedly positioned therein, a pair of sealing assemblies slidably positioned in said expansible casing shaped to contact the said car axle and seal the opening between the said car axle and the said expansible casing, each sealing assembly composed of a lubricant carrying sealing pad and a wear resisting axle contact means therefor, and spring means within said expansible casing adapted to engage the said sealing assembly and urge the said sealing assemblies into sealed relationship against the said car axle.

HARRY H. GRECE.